United States Patent [19]

Koppe et al.

[11] Patent Number: 5,413,790
[45] Date of Patent: May 9, 1995

[54] HEAT-SHRINKABLE MATERIALS, ESPECIALLY FOR CABLE SPLICES AND JUNCTIONS

[75] Inventors: Heinz Koppe, Castrop Rauxel; Norbert Nicolai, Dorsten; Winfried Stupp, Hagen, all of Germany

[73] Assignee: Stewing GmbH & Co. KG Werk Berlin, Berlin, Germany

[21] Appl. No.: 984,923

[22] Filed: Dec. 3, 1992

[30] Foreign Application Priority Data

Dec. 6, 1991 [DE] Germany .................. 41 40 273.1

[51] Int. Cl.$^6$ .................................... A01N 25/34
[52] U.S. Cl. .................................... 424/411; 428/34.9; 428/195; 428/575; 428/910; 174/DIG. 8
[58] Field of Search ............. 428/34.9, 36.4, 34.5, 428/515, 516, 910, 195; 174/DIG. 8; 424/405, 414, 419, 411

[56] References Cited

U.S. PATENT DOCUMENTS

| | | | |
|---|---|---|---|
| 4,171,463 | 10/1979 | Watkins | 424/411 |
| 4,499,136 | 2/1985 | Nakamura et al. | 174/DIG. 8 |
| 4,631,098 | 12/1986 | Pithouse et al. | 428/34.9 |
| 4,816,309 | 3/1989 | Hutt et al. | 428/34.9 |
| 4,818,525 | 4/1989 | Kamada et al. | 424/411 |
| 4,900,601 | 2/1990 | Hälg et al. | 174/DIG. 8 |
| 4,915,139 | 4/1990 | Landry et al. | 428/34.9 |
| 4,952,437 | 8/1990 | Winterhoff et al. | 428/34.9 |
| 5,102,662 | 4/1992 | Gallagher | 424/411 |
| 5,194,265 | 3/1993 | Boettcher et al. | 424/411 |
| 5,221,387 | 6/1993 | Robbins et al. | 156/85 |

Primary Examiner—Ellis P. Robinson
Assistant Examiner—Rena L. Dye
Attorney, Agent, or Firm—Herbert Dubno

[57] ABSTRACT

A thermomorphic covering layer is applied to a heat-shrinkable body of thermoplastic material, e.g. a heat-shrinking sleeve adapted to surround and seal a cable splice so that when the heat-shrinking temperature is reached, the thermomorphic covering melts to form a continuous protective layer on the sleeve. It contains glass fibers or an insecticide or microbicide to protect the sleeve against pest deterioration.

18 Claims, 2 Drawing Sheets

HEAT-SHRINKABLE MATERIALS, ESPECIALLY FOR CABLE SPLICES AND JUNCTIONS

FIELD OF THE INVENTION

Our present invention relates to heat-shrinkable articles, especially sleeves and, most particularly, sleeves designed to be heat shrunk onto a cable joint or splice. The invention also relates to a heat-sensitive coating for a heat-shrinkable product such as a shrink seal of thermoplastic synthetic resin which can be used to seal a cable joint and, specifically, a heat-sensitive thermal coating which can signal to the user the attainment of an optimum heat-shrinking temperature.

BACKGROUND OF THE INVENTION

Heat-shrinkable products have been used increasingly in recent years for a variety of purposes, including the sealing of cable or wire joints or splices and, more generally, the application of an insulating sleeve in electrical and like applications. A heat-shrinkable tubular section, hereinafter referred to as a heat-shrinkable sleeve, can be placed over a splice in a cable and subjected to heat from a radiant heating source, a burner, a contact heater or the like. The heat causes the shrinkable material to contract and form a tight seal around the joint which can be electrically insulating and hermetic.

Heat-shrinkable products can also be provided in the form of a tape which can be wrapped around electrical or other joints and which can be heated to the shrinking temperature to increase the tension of the type around the body to which it is applied and to effect fusion or adhesion of the inner surface of the heat-shrinkable material to the material to which it is applied.

In general with heat-shrinkable materials, the temperature development in the product is of considerable importance since the heat-shrinking operation requires a thermal softening and a subsequent hardening of the product to achieve the seal and the bonding to the body to which the product is applied. The temperature to which the material is brought is of special importance with heat-shrinkable materials which have an adhesive layer.

With temperatures which are too low, the adhesive layer may not melt and thus may not provide a satisfactory bond because there is insufficient adhesion of the shrunk material to the body to which it is applied.

With an excessively high temperature, the adhesive layer can be damaged or the heat-shrinkable material to which the adhesive layer is applied can be injured.

To avoid these drawbacks, it has been proposed to include thermally-sensitive coloring agents in or on the shrink products, these agents or substances providing certain color changes or color developments when appropriate temperatures are reached (see U.S. Pat. No. 3,816,335, U.S. Pat. No. 4,105,583, U.K. patent 1,511,053 and U.K. patent 2,038,478). Coatings of these thermally-sensitive coloring agents, however, provide no additional function and have not always been fully satisfactory.

The products made with these materials, for example, can be susceptible to insects, microorganisms and rodents and may suffer deterioration from such pests.

It is also known to provide a heat-shrinkable article of the aforedescribed type with at least one layer which, upon reaching the shrinking temperature, becomes transparent. The heat-shrinkable material or object can thus be provided of a particular color with a coloring agent, pigment or dyestuff which imparts a hue or color to the shrinkable material which is different from the color of the object to which the material is applied.

The heat-shrinkable article may itself comprise two cross-linked superposed layers of which only the inner layer is colored while the outer layer is not colored or is only weakly colored. In this system, the outer layer is not initially transparent, but rather is opaque to a greater or lesser extent so that the inner layer cannot be seen and its color is not ascertainable.

Only upon heating of the outer layer and the attainment of the desired temperature, which should lie as close as possible to the optimum shrinking temperature, does the outer layer become suddenly transparent so that the inner layer will become visible (see German patent document DE-OS 33 41 617).

OBJECTS OF THE INVENTION

It is the principal object of our present invention, therefore, to provide an improved heat-sensitive coating for a thermally-shrinkable material, object or article which will avoid the drawbacks of earlier systems and provide an indication of attainment of a predetermined temperature while, in addition, upon hardening, fulfilling an additional function as well.

A more specific object of this invention is to provide an improved heat-shrinkable material, article or object, especially a heat-shrinkable sleeve for protecting a cable joint or splice which can prevent overheating or underheating and also will afford protection against pests.

SUMMARY OF THE INVENTION

These objects and others which will become apparent herein-after are attained, in accordance with the invention, by utilizing a thermomorphic coating material of a synthetic resin which can form an intimate bond with a heat-shrinkable object to which it is applied.

According to the invention, this thermomorphic coating is provided with spaces between regions of the coating so that, upon attainment of a predetermined temperature, generally equal to or approximately equal to the heat-shrinking temperature, will flow to fill the gaps between the islands of the coating material and, upon subsequent congealing or hardening, will form a continuous sheath protecting the coated object against some pest or the like, especially rodents, insects or microorganisms.

The attainment of the desired temperature is signalled by the flowing of the coating material to fill the gaps between the regions at which the coating material is bonded to the thermally-shrinkable object.

The formation of the intimate bond with the outer surface of the sleeve can be effected with the aid of an adhesive agent or an adhesion-promoting agent which can be heat stable.

The thermomorphic material can be any synthetic resin which will flow to fill the gaps between the islands of the coating material. It may be a synthetic resin formed by polymerization of a single monomer, or a copolymer or terpolymer or a mixture of polymers, copolymers and terpolymers or combinations thereof.

Because of the range of temperatures at which different polymers or polymer mixtures can melt, we can provide a very fine distinction between the temperatures signalled by the specific coating layers with a precision in the degree or fraction of a degree range.

The change in the form of the coating resulting from the heating thereof can be enhanced and made more apparent to the view of the user by selection of the composition of the coating material, the surface structure with which it is applied, transparency, brightness, shininess or the like.

Preferably the coating material can include glass fibers or other materials resistant to rodents, insecticides and/or biocides which are capable of forming barriers of degradation by insects or microorganisms. The solidification of the coating material in the form of a continuous layer can be thus provide protection against rodents, insects and/or microbes.

The coating material can be applied in a continuous layer with regions of increased thickness and decreased thickness so that upon solidification after attainment of the heat-shrink temperature, a uniform thickness layer will be readily apparent and visible, or it can be applied in an interrupted form, e.g. in the form of points or dots, undulations, strips or flakes or other geometric patterns. It can also be applied at selected locations which are sufficiently closely spaced that regions between these locations will be bridged when the coating is melted.

The surface of the coating material can be smooth or profiled and in the case of profiled materials, after thermomorphic modification and solidification, a smooth coating can be discerned.

In the case of a uniform thickness or smooth coating, the coating material can be applied in a thickness of 0.01 to 0.5 mm and in the case of profiled coatings, thicknesses of 0.2 to 1 mm are preferred.

The coating preferably after heating to the heat-shrinking temperature and cooling (solidification) can be formed of a continuous sheath for the heat-shrinkable sleeve.

The coating material can be applied or constituted as a cover foil, e.g. of plastic which can be either isotropic or can have a predetermined orientation, e.g. a uniaxial or biaxial preorientation.

A heat-shrinkable object according to the invention can thus comprise:
  a layer of a heat-shrinkable material capable of shrinking upon being subjected to a predetermined temperature; and
  a thermomorphic coating material applied to an exposed surface of the layer for signalling the attainment of an optimum shrinking temperature thereof, the thermomorphic material being composed of a synthetic resin containing glass fibers or an insecticide or a microbicide or a mixture thereof and forming an intimate bond with the layer and a protective cover coating thereon upon melting at the heat-shrinking material and rehardening.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
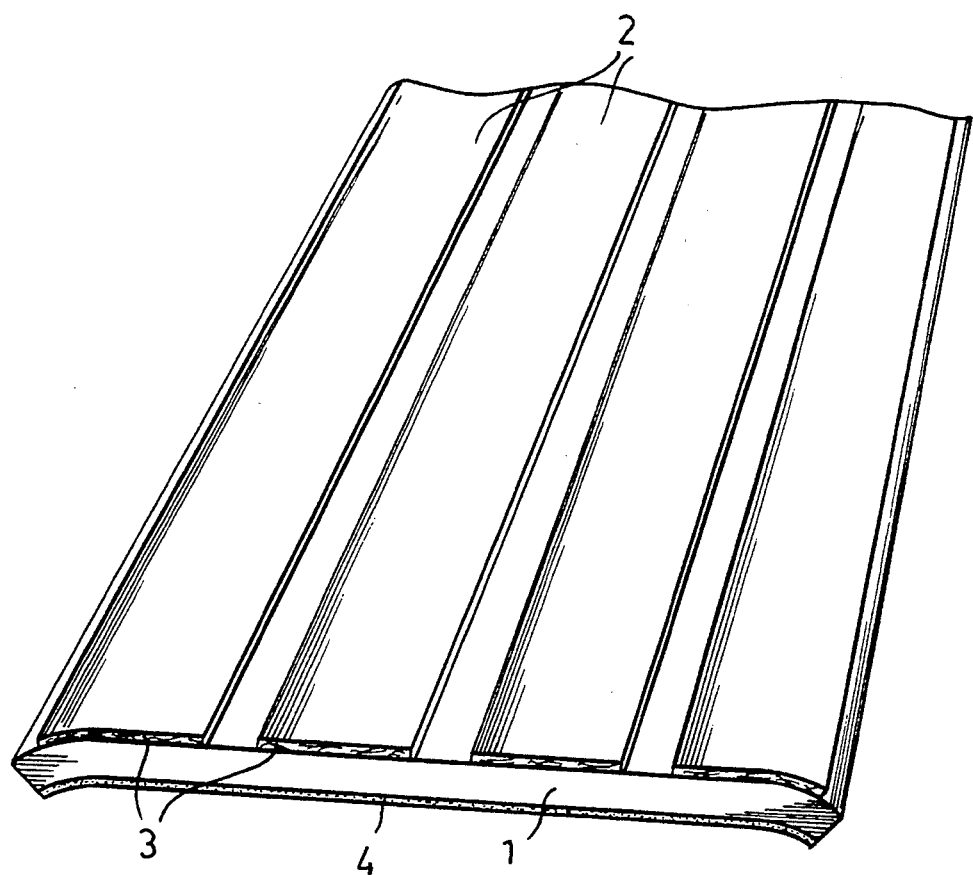
FIG. 1 is a perspective view of a portion of a heat-shrinkable sleeve illustrating principles of the invention.

The diagrammatic illustration of FIG. 1 is intended to represent a heat-shrinkable sleeve 1 provided with a coating material of a synthetic resin.

The sleeve 1 which is a substrate can have its outer surface subjected to a treatment like roughening, flaming, corona discharge or the like so as to make it more susceptible to adhesion of the strips of the coating material to synthetic resins which are applied perpendicular to the direction of principal shrinkage and are spaced apart by about 2 mm.

The strips 2 can be applied by a conventional melt-coating process. The thickness of the synthetic resin strips 2 can amount to about 0.3 mm. In the illustration, the strips 2 are composed of polyamide 4, 6 (nylon 4,6) i.e. a condensate of pyrrolidone, hexamethylene, diamine and adipic acid which has a crystal-like melting point of 290° C. This synthetic resin contains 5% by weight of short glass fibers 3 as a filler. The coating is applied to conventional heat-shrink seals with a heat-shrinking temperature of 290° C. The sleeve can be applied to a cable splice and heated by a butane torch or infrared lamp. The heating is continued until the surface coating flows to bridge the gaps between the strips at 290° C. at which time the sleeve shrinks onto the splice.

After cooling, the material of the strips 2 forms a substantially continuous cover layer which has been found to protect the splice against rodents. At those portions of the heat-shrunk sleeve which are thinnest, and thus most susceptible to rodent attack, the sheath is thickest.

Figure 2:
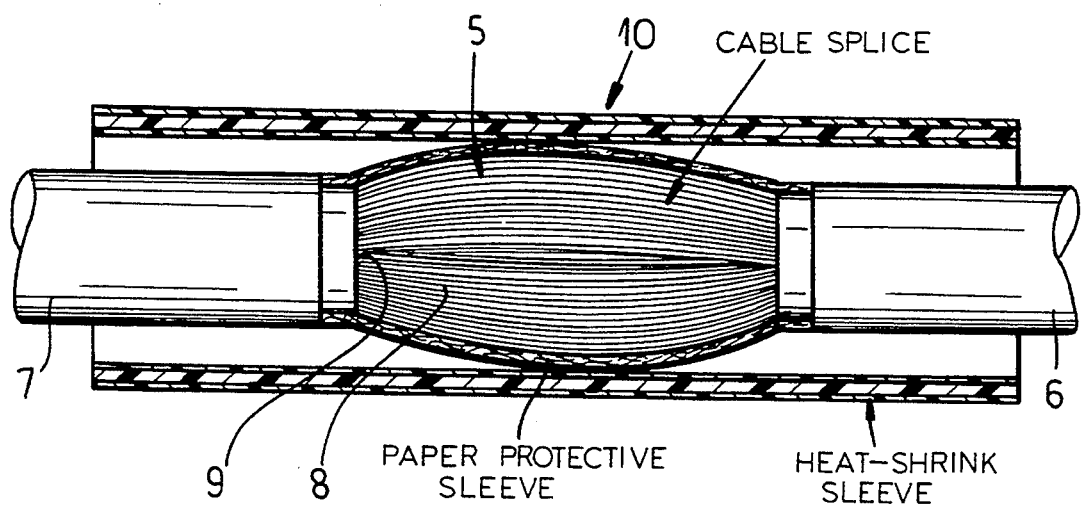
FIG. 2 is a view of a cable splice provided with a sleeve of the type shown in FIG. 1, the sleeve being shown diagrammatically and in cross section.
Figure 3:
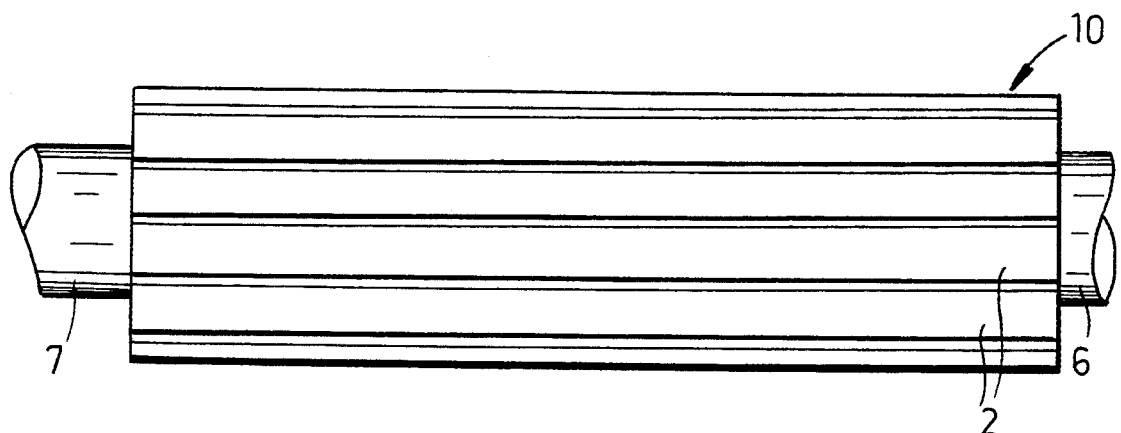
FIG. 3 is an elevational view of the sleeve prior to heat shrinking in place upon a cable splice.
Figure 4:
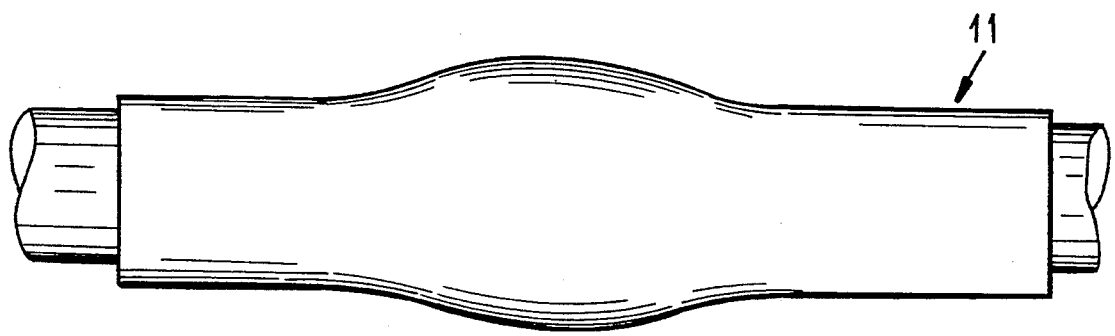
FIG. 4 is an elevational view of the splice after heat shrinking.

The principles are shown in FIGS. 2–4. Here the splice 5 is formed between two cables 6 and 7, each having a wire 8, 9 emerging from its insulation and twisted together. The sleeve 10 which can be made from the materials shown in FIG. 1, is slid over this splice and as can be seen from FIG. 3, initially is distinguishable by having its strips 2 in spaced-apart relationship around the sleeve.

When the sleeve is heated to the heat-shrinking temperature, it deforms and shrinks to hug the turns of the splice as shown at 11 in FIG. 4 and the coating, which is filled with glass fibers, flows together to cover the sleeve uniformly.

Figure 5:
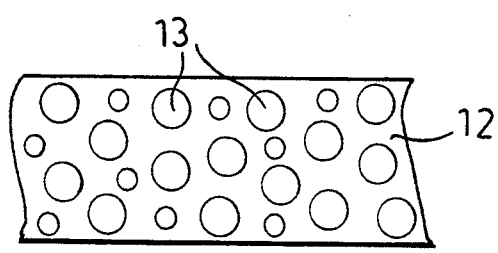
FIGS. 5, 6 and 7 are views showing different patterns with which the coating material can be applied to a heat-shrinkable material, prior to the fusion of the coating material.

As can be seen from FIG. 5, the heat-shrinkable object 12 can have the coating material which is capable of flowing at the heat-shrinking temperature applied in a pattern or in a random distribution of dots or circular islands 13.

Figure 6:
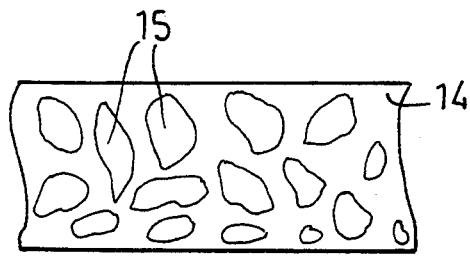
Figure 7:
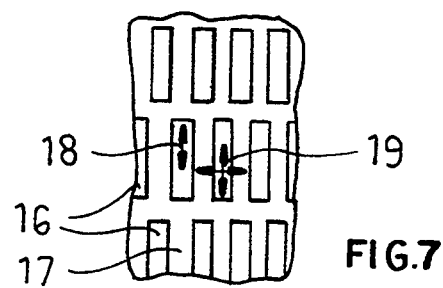

In FIG. 6, the heat-shrinkable object 14 is shown to be covered with islands 15 of irregular shape. In FIG. 7, strips 16 are applied in a geometric pattern to the heat-shrinkable object 17 and may be uniaxially oriented or biaxially oriented as represented by the arrow 18 and 19, respectively, in FIG. 7.

The preorientation can be effected by stretching the foil in one direction (uniaxial orientation) or in two mutually orthogonal directions (biaxial orientation).

We claim:
1. A heat-shrinkable article, comprising:
  a substrate of a heat-shrinkable material capable of shrinking upon being subjected to a predetermined temperature and formed with an outer surface; and a layer of thermomorphic coating material covering at least a part of said outer surface of said substrate for signalling the attainment of an optimum shrinking temperature thereof by melting at the optimum shrinking temperature, said layer of thermomorphic material being composed of a synthetic resin containing an insecticide or a microbicide or a mixture thereof as a filler, and forming an intimate bond with said substrate, said layer forming a uniform protective cover coating on said substrate upon melting and flowing together of said layer followed by rehardening of said layer.

2. The heat shrinkable article defined in claim 1 wherein said layer is in the form of a heat-shrinkable sleeve of thermoplastic synthetic resin material for application to a cable splice.

3. The heat shrinkable article defined in claim 2 wherein said thermomorphic material is composed of a polymer of a single monomer, a copolymer, a terpolymer or a polymer mixture.

4. The heat shrinkable article defined in claim 3 wherein said thermomorphic material is provided in a continuous covering with regions of increased thickness and decreased thickness on said substrate.

5. The heat shrinkable article defined in claim 3 wherein said thermomorphic material is applied in a multiplicity of points on said substrate.

6. The heat shrinkable article defined in claim 3 wherein said thermomorphic material is applied in a flake pattern on said substrate.

7. The heat shrinkable article defined in claim 3 wherein said thermomorphic material is applied in a multiplicity of strips distributed over said substrate.

8. The heat shrinkable article defined in claim 3 wherein said thermomorphic material is applied in a predetermined geometric pattern to said substrate.

9. The heat shrinkable article defined in claim 3 wherein said thermomorphic material is applied at selected locations to said substrate.

10. The heat shrinkable article defined in claim 3 wherein said thermomorphic material is applied as a smooth-surfaced covering to said substrate.

11. The heat shrinkable article defined in claim 10 wherein said thermomorphic material is applied in a thickness of 0.01 to 0.05 mm.

12. The heat shrinkable article defined in claim 3 wherein said thermomorphic material is applied in a profiled covering to said substrate.

13. The heat shrinkable article defined in claim 12 wherein said thermomorphic material is applied in a thickness of 0.2 to 1 mm.

14. The heat shrinkable article defined in claim 3 wherein said thermomorphic material is applied as a foil to said substrate.

15. The heat shrinkable article defined in claim 14 wherein said foil is isotropic.

16. The heat shrinkable article defined in claim 14 wherein said foil is uniaxially preoriented.

17. The heat shrinkable article defined in claim 14 wherein said foil is biaxially preoriented.

18. The heat shrinkable article defined in claim 3 wherein said thermomorphic material is adhesively bonded to said substrate.

* * * * *